Figures 1, 2, 3, 4:
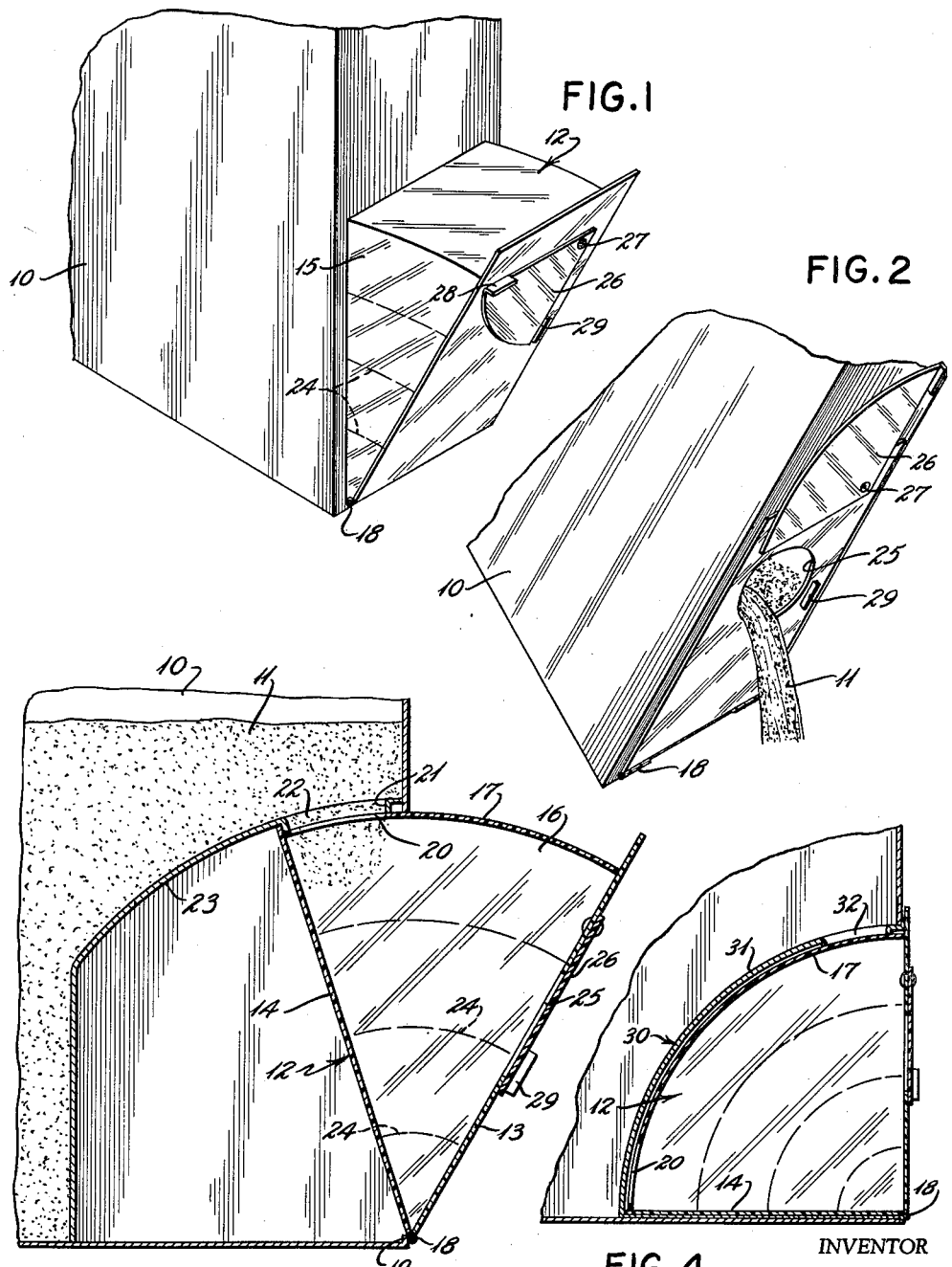

May 29, 1962    L. E. WAGONER ET AL    3,036,742
CONTROLLED MEASURING DISPENSER
Filed Nov. 3, 1959

INVENTOR
LUCILLE E. WAGONER &
DONALD M. CARD
BY
ATTORNEY 3,036,742
CONTROLLED MEASURING DISPENSER
Lucille E. Wagoner, 219 S. Hamilton St., and Donald M. Card, 1425 Birchfield Road, both of Saginaw, Mich.
Filed Nov. 3, 1959, Ser. No. 850,707
3 Claims. (Cl. 222—158)

This invention relates to containers used about the home and elsewhere for holding and dispensing commodities of various kinds and in various quantities and particularly to containers for substances affected by the atmosphere and from which it is desired to exclude the air to protect the same.

The invention relates especially to containers constructed to facilitate dispensing of the contents thereof in measured quantities and the dispensing portion of which can be closed to exclude the weather and to protect the contents of the container therefrom.

Heretofore containers have been produced having dispensing mechanisms which could be operated to discharge a portion of the contents of the containers and then closed to retain the remaining portion of the contents within the container. In the use of these devices it was necessary that separate measuring devices be employed to measure predetermined amounts and consequently such devices have been difficult to use and the costs have been increased accordingly.

It is an object of the invention to provide a combination container and measuring dispenser by which a graduated or predetermined amount of material can be dispensed and the container closed with the retained contents protected.

Another object of the invention is to provide a simple and inexpensive container with a pouring or dispensing spout at least a portion of which is transparent so that a predetermined quantity of the contents can be dispensed and with the pouring or dispensing spout attached to the container in such a manner that it can be used to interrupt the supply of material into such spout from the container.

Another object of the invention is to provide a container of any desired size and configuration with dispensing apparatus capable of measuring and separating from the container a predetermined quantity of the bulk product contained and with such dispensing apparatus composed of glass, plastic, metal, cardboard or other suitable material and with the measuring device capable of being made as a separate unit for application to a bulk container of appropriate size and configuration.

A further object of the invention is to provide a container and a measuring dispenser or discharge spout which can be tilted to approximately a 45° angle until the proper quantity of material is received therein whereupon it can be returned to its initial position with the measured amount therein and then an opening in the dispenser or spout can be uncovered and the measured amount poured from the dispensing apparatus.

Other objects and advantages of the invention will be apparent from the following description taken in conjunction with the accompanying drawing wherein FIG. 1 is a fragmentary perspective of one application of the invention wherein the spout is in a position to permit the inflow of material from the container to the spout;

FIG. 2, a fragmentary perspective with the spout closed and discharging the contents of the spout;

FIG. 3, a section on the line 3—3 of FIG. 1; and

FIG. 4, a modified form of the invention.

Briefly stated the invention is a dispensing container of any desired size and configuration with a dispenser or spout in the container which can be opened until a predetermined quantity is allowed to flow into the spout from the container whereupon the dispenser or spout is closed, such dispenser or spout having a portion which closes the openings between the container and the dispenser or spout and thereafter an opening in the latter can be uncovered and the measured quantity can be discharged.

With continued reference to the drawing, a receptacle or container 10 of any desired size and configuration and used for holding flowable material 11 of any character may be provided with a dispenser or spout 12 for the discharge of the contained material.

The spout is generally V-shaped having a front wall 13 and a rear wall 14 disposed angularly relative to the front wall. Side walls 15 and 16 are provided preferably of plastic or other transparent material and an arcuate top 17.

The spout is mounted on a pivot or hinge 18 carried by a lip 19 on the lower portion of the container 10 so that the spout may be oscillated to bring an opening 20 into registration with the turned-down flanges 21 of an opening 22 in a partition wall 23 of the container 10.

The rear wall 14 extends above the top 17 to form a stop which abuts the flange 21 when the spout is in the fully open position. The front wall 13 extends above the top 17 and abuts the container 10 to limit the inward movement of the spout 12. The downwardly turned flanges 21 slidably engage the arcuate top 17 to prevent the egress of the flowable material 11 when the spout is closed.

In order to measure a predetermined amount of the flowable material, the spout is provided with a transparent portion such as transparent sides of the spout on which are placed measuring or indicating indicia in the form of markings 24 so that the valve may be manually closed when the proper amount of flowable material has been measured into the spout. The flow of the material into the spout may be controlled by aligning the openings 20 and 22 to a greater or lesser amount.

When the spout has been filled to the amount desired the front wall 13 is moved inwardly so that the openings 20 and 22 are no longer in registration. In order to empty or discharge the contents of the spout, the front wall 13 is provided with an opening 25 normally closed by a cover 26 attached to a pivot 27 to the front wall 13 of the spout. The cover 26 is adapted to have a turned-up projection or lug 28 for engagement to aid in moving the cover to expose the opening 25 and the front 13 of the spout is provided with a lug 29 which forms a stop to insure that the cover will completely close the opening 25.

The modification illustrated in FIG. 4 is a self-contained unit having a spout 12 pivotally mounted on a hinge 13 mounted on the lower portion of a housing 30 having an arcuate upper portion 31 complementary to the top 17 of the spout and being provided with a downwardly turned opening 32 which slideably engages the top 17 and may be brought into registration with the opening 20.

In the operation of the device the spout is first pulled outwardly to bring openings 22 and 20 into registration to permit material within the container to flow into the spout. When the desired amount of material is in the spout, the spout is then closed and the cover 26 removed from the opening 25 in the front wall of the spout and the container tilted so that the material in the spout will be discharged through the opening 25.

It will be apparent from the foregoing that a container is provided having a dispenser or pouring spout into which material can be caused to flow until a measured amount is contained therein after which a discharge opening can be uncovered and the measured quantity poured from the dispenser or spout and all of which can be done with the container held in one hand of the operator.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A container for a pourable material, a dispensing spout having a transparent portion pivotally carried within said container and adapted to be moved outwardly thereof, a partition separating the contents of the container from said spout, said partition and spout having cooperating openings located in a manner to be brought into registration when the spout is substantially in its outermost position to permit the material in the container to flow into the spout and to be moved from such position to stop the passage of material from the container into the spout, said spout having a discharge opening, a cover for such discharge opening mounted to be moved to permit discharge of the measured contents of the spout through such discharge opening, and a measuring indicator on the transparent portion of said spout for controlling the quantity of material therein.

2. A container for a pourable material, a dispenser having a transparent portion pivotally mounted on said container and adapted to move outwardly thereof, a partition having a dispensing opening located between the pourable material and said dispenser, said dispenser having a receiving opening located in a position to be brought into registration with the dispensing opening in said partition when said dispenser is in its outward position relative to said container, a stop on said dispenser to limit the outward movement thereof, said dispenser having a discharge opening, a cover for the discharge opening adapted to be moved to permit discharge of the contents of said dispenser, and measuring indicia on the transparent portion of said dispenser, whereby a selected amount of material can enter the dispenser when the receiving opening in said dispenser and the dispensing opening in said partition are in registration and thereafter when the receiving and dispensing openings are out of registration the contents of the dispenser can be discharged through the discharge opening therein.

3. A dispenser for a container of pourable material comprising a dispensing spout having a receiving opening and a discharge opening, a partition having a dispensing opening and located between said spout and the pourable material, with the dispensing opening normally out of registration with the receiving opening in said spout, said spout having a transparent portion, hinge means for mounting said spout within the container whereby said spout is adapted to be pivoted outwardly of the container to bring the receiving opening in said spout into registration with the dispensing spout of said partition to admit a selected amount of material into said spout whereupon the receiving and dispensing openings are moved out of registration and the material in the spout discharged through the discharge opening therein.

References Cited in the file of this patent
UNITED STATES PATENTS

| | | |
|---|---|---|
| 2,393,454 | Bailey | Jan. 22, 1946 |
| 2,764,315 | Haecker | Sept. 25, 1956 |
| 2,775,270 | McKillop | Dec. 25, 1956 |
| 2,778,536 | Graves et al. | Jan. 22, 1957 |